Aug. 31, 1937.  W. CORDS  2,091,947
PACKING RING AND ASSEMBLY
Filed April 22, 1932   2 Sheets-Sheet 1
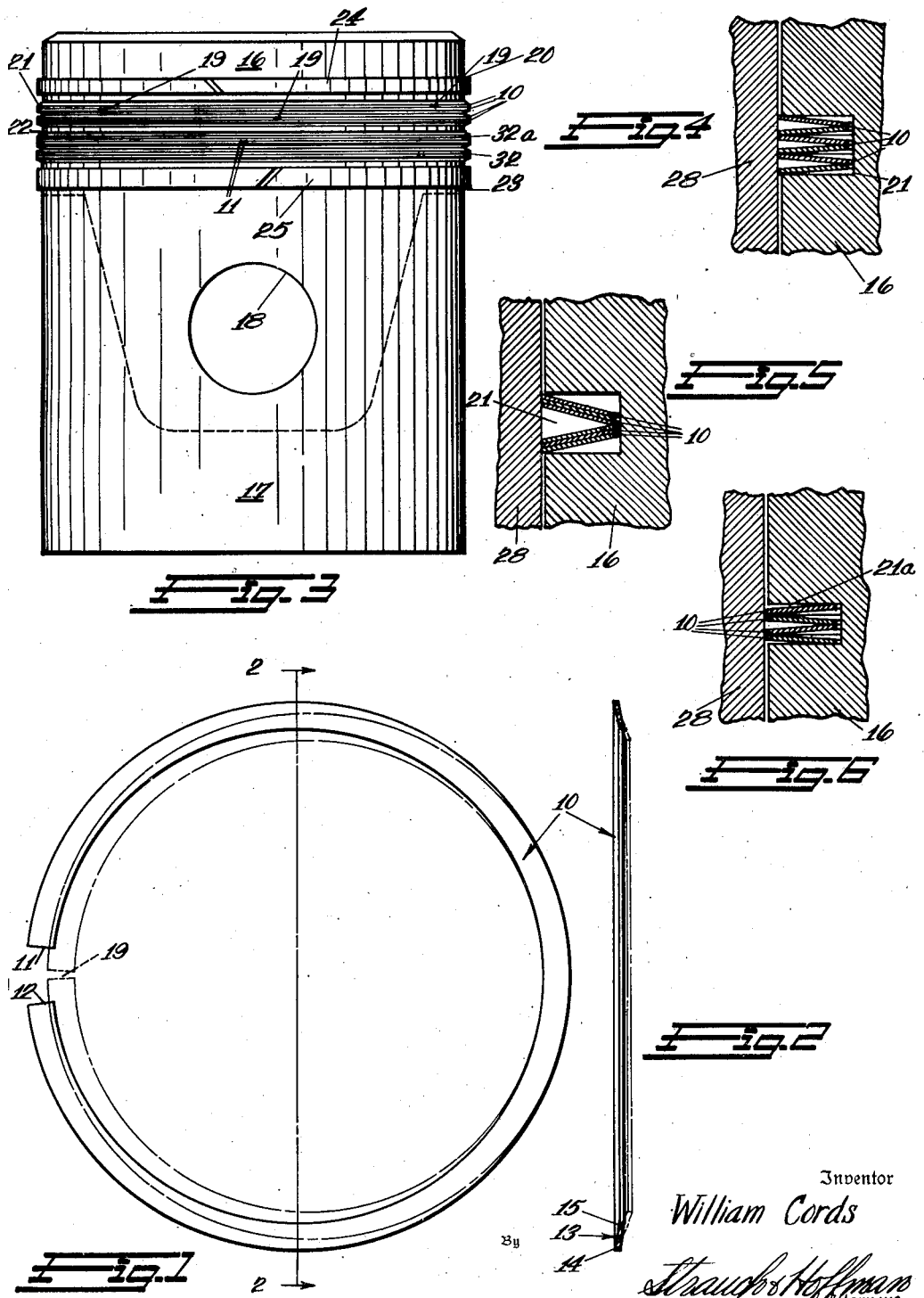
Inventor
William Cords
By
Strauch & Hoffman
Attorneys Aug. 31, 1937. W. CORDS 2,091,947
PACKING RING AND ASSEMBLY
Filed April 22, 1932   2 Sheets-Sheet 2
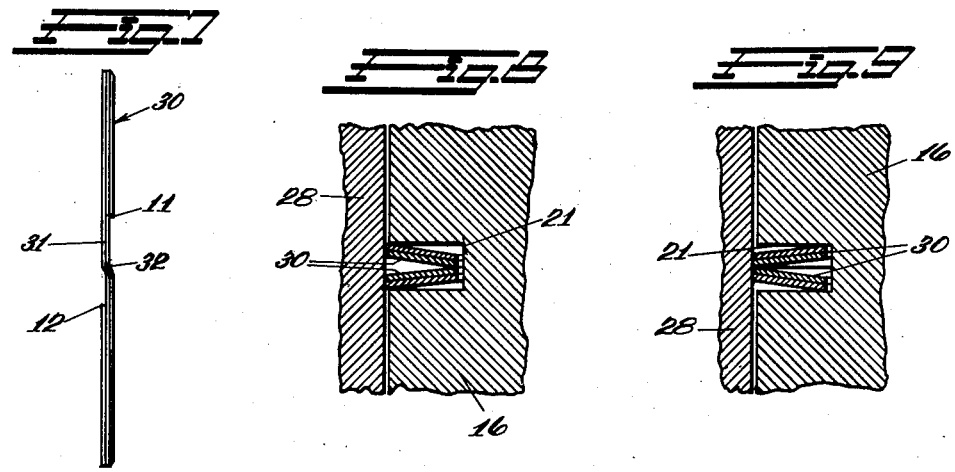
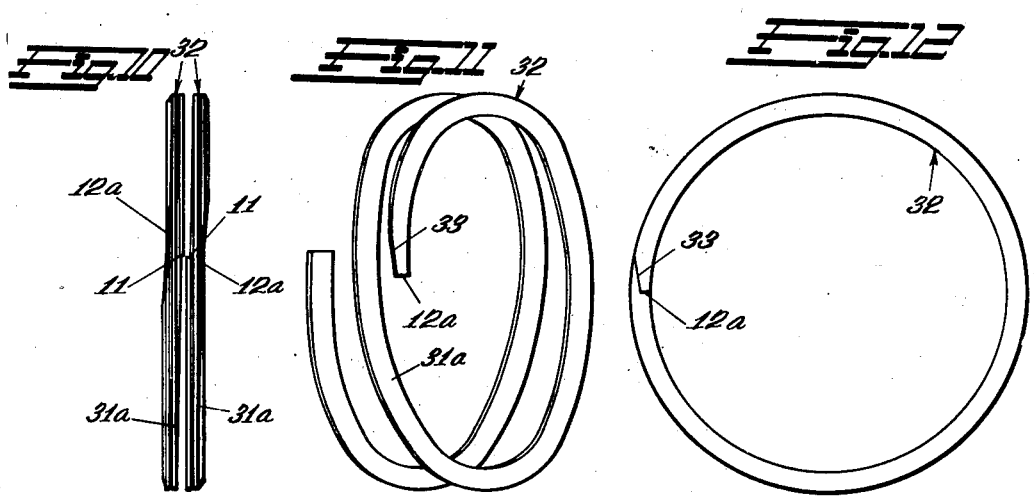
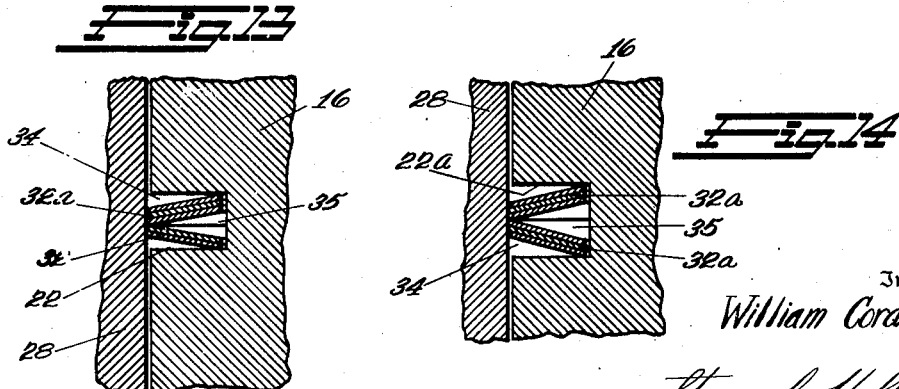
Inventor
William Cords Patented Aug. 31, 1937

2,091,947

UNITED STATES PATENT OFFICE 2,091,947

PACKING RING AND ASSEMBLY

William Cords, San Diego, Calif.

Application April 22, 1932, Serial No. 606,974

18 Claims. (Cl. 309—24)

This invention relates to packing rings and to methods of applying them to reciprocating plungers and the like for sealing purposes, and is in part a continuation of that disclosed in my copending application Serial Number 513,440, filed February 4, 1931, now Patent No. 1,919,584, granted July 25, 1933.

More particularly, the invention relates to novel packing rings intended for use particularly as sealing rings for pistons of internal combustion or similar engines, and to methods of utilizing such rings in various suitable combinations and relationships upon the grooved exterior walls of the pistons.

This invention aims to seal the joint between a reciprocating plunger and the walls of the cylinder in which it moves, by the use of metallic seal rings that are extremely thin and highly flexible, and that are mounted in grooves in the plunger in such a way that each of the thin rings employed exerts a relatively light pressure against the walls of the cylinder substantially independently of other rings that may be disposed in the same groove in the plunger.

A further object of the invention is to provide a packing ring that is normally dished in the process of its manufacture, and which may be substantially contracted in diameter in applying it to a piston so as to increase the dished effect of the ring, thus providing a line contact or contacts between the edge of the ring and the walls of the cylinder in which the piston moves, and at the same time produce a ring which will automatically adapt itself to the walls of the cylinder in which it is placed with great accuracy and a high degree of resilience.

A still further object of the invention is to provide a sealing arrangement for the piston, intended for reciprocatory motion in a cylinder, in which the grooves provided in said piston for the sealing rings are substantially filled with independent, or separate, thin metallic rings of dished form, the dishing of certain of said rings being disposed oppositely from that of other rings, whereby the normal reciprocation of the piston in the cylinder will have a tendency to flatten the dished rings and thus cause them to expand into firm sealing contact with the walls of the cylinder irrespective of minor variations from a regular contour in the walls of the cylinder.

Another object of the invention is to provide a novel packing ring having a width many times its thickness, and further having unusual flexibility and contractual yieldability, due to its formation from light and resilient steel ribbon or the like.

A further object is to provide a plunger packing in which a hydraulic oil seal will be maintained during operation. It is also an object to devise a packing which will have a peripheral oil channel provided at one or both of the edges of its sealing surface.

Still another object of the present invention is to devise a circular ring of more than one complete convolution of flexible material so that, when fitted adjacent a surface to be sealed it will exert a perfectly uniform pressure at all points along the sealing line. In this connection it is a further object to provide a gapless ring from thin material forming more than one convolution and yet so designed that it shall have substantially uniform thickness at all points around its periphery.

It is also an object to devise thin rings which cooperate when grouped together and which can be used in groups of selected numbers and sizes for sealing grooves of various widths.

These and other objects will fully appear upon a study of the following detailed description and its appended claims, when taken in conjunction with the accompanying drawings, wherein:

Figure 1 is a plan view of one form of improved packing ring of the present invention, the ring being shown in full lines in its manufactured form, and in broken lines in the form it assumes when put into use.

Figure 2 is a sectional view taken on the plane indicated by the line 2—2 in Figure 1, looking in the direction of the arrows, the broken lines showing, with some exaggeration, the ring contracted as when put into use.

Figure 3 is a side elevational view of a piston equipped with some of the packing rings of the present invention, showing several ways of using said rings.

Figure 4 is an enlarged detailed sectional view, taken radially through a set of rings disposed in one groove of a piston, showing one arrangement of the dished rings of Figures 1 and 2 in that groove.

Figure 5 is a detailed sectional view similar to Figure 4 showing another arrangement of the dished rings within the groove.

Figure 6 is a fragmentary section similar to Figures 4 and 5 and showing a further modified method of assembling the rings in the groove.

Figure 7 is a side elevational view of a second form of ring constructed in accordance with the principles of the present invention.

Figure 8 is an enlarged fragmentary sectional view showing one method of using the rings of Figure 7.

Figure 9, in an illustration like that of Figure 8, discloses another method of applying the rings of Figure 7.

Figure 10 is a side elevational view of a ring assembly consisting of several cooperating parts or rings that constitute a third form of the rings of this invention.

Figure 11 is a perspective view showing one of the rings of Figure 10 deformed into an unnatural position against its own inherent resilience, this view being provided solely for ensuring clarity of disclosure of the ring formation.

Figure 12 represents a plan view of the ring of Figure 10, as seen when looking toward the right side of the latter view.

Figure 13 is an enlarged fragmentary section showing one method of applying the rings of Figure 10 to a piston groove.

Figure 14 is a similar view disclosing another method of utilizing the rings of Figure 10.

Like reference characters indicate like parts throughout the several figures.

The packing rings of the present invention are formed of thin resilient metal having a width many times the thickness of the metal utilized in forming the rings. Preferably, the rings are constructed from oil-tempered ribbon steel bands having, for the average multi-cylinder engine piston a width of about $\frac{3}{32}$–$\frac{3}{16}$ of an inch and a thickness of approximately .020 inch. These flat bands may be obtained from elongated straight stock or from spools of steel ribbon. The rings are constructed by bending the bands into either approximately circular or exactly circular form either individually or as a helical coil which must be cut subsequently into rings of desired circumferential length. The broad idea of winding and cutting is old, for example, in White Patent No. 1,064,269 and Roehl Patent No. 1,322,056. Preferably the diameter of the bent ring before it is contracted in positioning it in the cylinder, exceeds by $\frac{1}{8}$" the diameter of the cylinder in which it is meant to be compressed and operated.

The ring is bent, while cold, on lines transverse to the width of the band of metal from which the ring is formed, and use is made of the fact that the portions of the metal to the outside of the neutral axis are stretched or put under tension during the bending operation, while the portions of the metal to the inside of the neutral axis are compressed, to give to the completed ring the characteristic of conforming readily to the contour of the walls of the cylinder in which it is caused to operate. It will be found that if a thin band of metal having a width many times the thickness of the band is bent on lines normal to the width of the band, that it will have a tendency during the bending operation to assume a dished form,—i. e., a form wherein the plane of the outer periphery of the ring is laterally offset from the plane of the inner circle of the ring. By this invention it is proposed to permit the rings to assume such form to a limited or slight degree during the bending operation. This tendency arises by virtue of the stretching of the portions of the metal beyond the neutral axis and the compression of the portions of the metal to the inside of the neutral axis just referred to. A strip may be bent in this way to form a piston ring that is capable of being readily contracted, when positioning it in the cylinder in which it is to operate, to a very substantial degree without setting up in the ring very substantial forces tending to expand it when in operation, which forces would manifest themselves by an excessive wear of the cylinder walls. On the other hand, due to the fact that the rings of the present invention may be contracted substantially in placing them in the cylinder, said rings have a distinct tendency to follow and conform accurately to the walls of the cylinder. Nevertheless the ring is highly flexible and does not apply a great degree of pressure against the walls of the cylinder with the result that wear is minimized, though an effective seal is provided.

Referring again to the drawings, the numeral 10, Figures 1 and 2, designates one form of improved piston ring constructed in accordance with this invention. The ends 11 and 12 of the rings are relatively widely spaced apart as shown in full lines in Figure 1, this representing the normal condition of the ring prior to its application to the cylinder. As illustrated in the drawings, the ring has a width many times the thickness thereof. As a preferred example, the width of the rings may be $\frac{1}{8}$ of an inch, while the thickness thereof is approximately .020", as above stated, though other roughly proportionate dimensions may be selected. The ring is bent from a flat strip or straight band of metal in a manner more fully described in my aforementioned copending application, the bending taking place on lines normal to the width of the strip. When the strip is bent in this way, the portions of the metal adjacent the neutral axis 13, which is approximately at the center of the strip, are neither elongated nor compressed. However, the portions of the metal on the outside of said neutral axis designated by the numeral 14, Figure 2, are stretched during the bending operation, while the portions 15 of the metal disposed inwardly of the neutral axis 13 are compressed. This results in the strip assuming a slightly dished form, if it is permitted to do so during the bending operation, and preferably the piston rings of this invention are bent in such manner that the ring is permitted to become slightly dished, frustro-conically, during the bending operation. This dishing, however, is exaggerated in the drawings in the interest of clarity. The dishing may be forced to take a slightly convex or concave curvature, if desired.

Preferably, the ends 11 and 12 are spaced apart sufficiently that the rings may be contracted to a size $\frac{1}{8}$ of an inch smaller than the original diameter thereof, the ends 11 and 12 being brought into relatively close proximity to leave only a short gap 19, as illustrated in dotted lines in Figure 1 of the drawings, thus forming rings each of which consists of substantially one complete convolution of metal. When the ring is contracted in this manner, to cause it to fit within the cylinder in which it is to operate, it will be understood that the dishing of the ring is increased by the operation of contraction thereof, as illustrated in broken lines in Figure 2, though the dishing of the rings is exaggerated in this figure.

The rings thus formed have a high degree of resilience and an ability to conform to the walls of the cylinder, providing a tight seal though the rings bear relatively lightly upon the walls of the cylinder. The effectiveness of the ring as a seal is materially increased, by virtue of the fact that the dishing of the ring in contracting it to fit in the cylinder and in the process of its formation, provides a line contact between the ring and the walls of the cylinder.

The packing ring just described may be used in a large number of different ways in sealing the joints between a reciprocating plunger and the cylinder in which it moves. Preferably, the rings are applied to grooves in the cylinders so that a plurality of rings are disposed in each groove, the rings being so arranged that the splits between the ends thereof are disposed in staggered relation so that a complete seal is provided around the entire piston. The rings may be applied to grooves formed in the head of the piston in any desired manner, adjacent the edge thereof, in the center thereof, or in both the head and skirt of the piston as may be desired.

One, at present approved way of using the rings of the present invention, is illustrated in Figure 3 of the drawings in which the numeral 16 designates the head of a piston having a skirt 17 provided with wrist pin receiving openings 18. The head 16 of the piston may be provided with packing ring grooves 20, 21, 22 and 23. The groove 20 may be provided with a compression ring 24, of the type having a thickness of the same order as the width of the ring, which rings have become more or less conventional. The groove 23 may be provided with an oil-scraper ring 25. The ring 25 is likewise a ring of the type in which the thickness and the width of the ring are proportioned so as not to be substantially different. The rings 24 and 25, because of their thickness, cannot be made to bear too strongly against the walls of the cylinder in which the piston moves without causing excessive wear and rapid destruction of the cylinder walls. The rings 24 and 25 which are relatively thick, by virtue of their construction, minimize the clearance between the piston and the walls of the cylinder; and the rings disposed in the grooves 21 and 22 are provided to complete the seal, each of the grooves 21 and 22 being provided with a multiplicity of the thin rings of the present invention. Said rings are disposed side by side in a groove of sufficient width to receive as many rings as may be desired to obtain the perfect seal between the walls of the cylinder and the piston to which reference is above made.

As illustrated in Figure 3, the groove 21 is filled with rings 10, the spaced ends 11 and 12 of which are disposed in staggered relation to each other so that the adjacent rings will seal the gap 19 of any ring of the group disposed in the groove. The rings carried in the lower groove 22 are of an endless type yet to be described. Of course it is not essential that the grooves contain different kinds of rings, and it will readily be understood that all of the rings may be of the same or of several different types, and that the rings of each groove may be assembled in various relationships, as described below. Each groove preferably is completely filled with rings, but the rings must not be fitted so tightly as to lose their dished form which results in the production and maintenance of at least one small V-shaped clearance or channel as will be seen from subsequent discussion of Figs. 4, 5 and 6.

Preferably, the multiplicity of rings in the grooves 21 and 22 are so assembled that approximately half of the rings in each groove have their dished or concave faces turned in one direction, while approximately the other half of the rings in that groove have their concavities facing in the opposite direction. Three convenient ways, of thus arranging the multiplicity of rings 10 in the groove 21 of the piston 16, are illustrated in Figures 4, 5 and 6 of the drawings. In Figure 4, alternate pairs of rings 10 are arranged with the dished sides of the rings of each pair facing in opposite directions, all of said rings bearing against the walls 28 of the cylinder to provide spaced circular contact lines for sealing purposes. In Figure 5, one group of three rings 10 has its dish or concavity facing in one direction, while another group of three rings has the concavity therein facing in the opposite direction. In Figure 6, the rings 10 are arranged in pairs with the two rings of each pair having their concavities facing each other. This arrangement is essentially the same as in Figure 4, with the individual top and bottom rings of the latter eliminated so that the narrower groove 21a of Figure 6 will be properly filled. This arrangement may be said to be illustrated in the upper groove 21 of Figure 3. Any other convenient manner of using the rings may be resorted to, and the number used in each group in any groove may be varied in accordance with the groove width and other requirements of the situation in which the rings are used.

In certain assemblies of the rings just described there is a possibility of some of the rings shifting sufficiently during operation to bring their gaps 19 into transverse alignment and thus to slightly impair the sealing efficiency. Accordingly I have devised a gapless ring suitable for universal use under substantially all conditions,— several preferred forms and methods of assembling these rings being illustrated in Figures 7-14 inclusive.

In Figure 7 there is shown a gapless ring 30 formed from the same ribbon-like, oil tempered steel as the ring of Figure 1, but bent out of a longer strip of material so that its ends will be interconnected by more than one complete convolution or circle of metal. A portion of this convolution 31 of course closes the gap that otherwise would appear between the ring ends, and said particular portion is crimped at 32 so that the ring ends may approach each other without increasing the uniform over-all thickness of the complete ring,—i. e., so that the ring ends will be circumferentially aligned with those portions of the convolution that have been laterally offset by the crimping operation. The ring is illustrated in natural position with its ends so spaced apart that, upon contraction of the ring to fit it within a packing groove, the ends will be brought substantially into transverse alignment and into engagement with the opposite sides of the crimped portion 32.

The ring 30, just described, preferably is bent to an exact circular shape prior to the simple crimping step, so that when assembled it will expand uniformly into full peripheral contact with the cylindrical wall that it is designed to seal. Further additional convolutions 31 may be included in the ring to increase the thickness and number of circular line contacts of the latter if desired, in which event the several added convolutions will be crimped at transversely aligned points and in precisely the same way so as not to throw the ring out of proportion where it is crimped. The ring of Figure 7, (and also that of Figures 10-12, later described), has all of the advantages of a small group of the rings of Figure 1, and, in addition eliminates the gaps of the latter. It may be used singly or in sets of opposed groups, each group of which may comprise one or more rings. Two suitable methods of assembly are illustrated in Figures 8 and 9.

In Figure 8, which corresponds somewhat to the modified arrangement seen in Figure 5, two rings 30 are assembled with their dished sides turned away from each other into engagement with the side walls of the groove 21. In Figure 9, two of the same rings are assembled with their dished or concave sides abutting each other adjacent their peripheries so as to form, in effect, four closely spaced circular sealing lines for contact with the bore of the cylinder.

In Figures 10–12 there is illustrated a preferred form of gapless ring 32 which differs chiefly from that of Figure 7 in that the crimping is eliminated, and one end of the ring is feathered to a rather sharp edge 12a, by gradual reduction of the thickness of the metal adjacent the tip end. The outer corner of this sharp edge is beveled or rounded off, as at 33, to prevent cutting or scoring of the cylinder wall when the ring is used. The other end, 11, of the ring may be feathered also, but preferably takes the form of a blunt edge normal to the circular ring axis, for a purpose presently explained.

Each ring 32 is made up in exactly round shape which it retains, except for contraction in diameter, when assembled in use. It embodies, like the form of Figure 7, at least one complete convolution of metal, 31a, between the ring ends. Figure 11, which is an unnatural view showing the ends drawn laterally apart against an inherent ring resistance that normally maintains the laminations of the ring in close surface contact with one another, is provided for clearly illustrating the convolution referred to.

The two rings seen in Figure 10 are identical in formation, but one of them has its position reversed relative to the other to adapt the dished faces of the rings for engagement and thus bring the blunt-edged ends 11 adjacent each other. This assembly may then be utilized either as a complete packing or as one of a group of similar sets of rings (as in Figures 4 and 6, for example) of a thicker packing. When in use, the ends 11 abut each other complementally to prevent relative ring rotation in one direction and to render the assembly substantially uniform in thickness for efficient sealing of a groove of uniform width.

One or more of the rings 32 may embody additional fractional or complete convolutions 31a, if desired, for the purpose of adapting the assembly for efficient use in grooves of greater width than that designed to receive the assembly shown in Figure 10. For example, in Figure 13, (which may be said to be a detail of the arrangement of Figure 3), one of the rings 32 is combined with a similar but wider ring 32a in order to fit properly within the piston groove 22; and in Figure 14 there is illustrated an assembly comprising two of the rings 32a for use in a groove 22a that is about $\frac{1}{32}$ inch wider than the groove 22. Some of the rings thus are interchangeable in assemblies designed for grooves of various sizes, and all rings are interchangeable to the extent that those of the largest size may be cut readily to form thinner rings.

As previously stated, the rings of this invention are designed to substantially completely fill a groove, leaving one or more narrow V-shaped clearances or channels resulting from the complemental dished shapes of the associated segments, and also ensuring good sealing contacts between the rings themselves and between the rings and the groove walls. When reciprocation of the piston or fluid pressure acting laterally upon the packing, or both, causes compression of the ring assembly the dished rings of the latter are flattened somewhat and their diameters slightly increased with the result that the ring peripheries are forced into correspondingly better sealing engagement with the cylinder bore. The improved rings thus provide not only an efficient oil seal but also a good compression packing. With reference to Figures 13 and 14 it should be observed that endless channels 34 are formed between the groove sides and the ring assembly. These channels serve to scrape and receive oil and thus prevent it escaping past the rings, and also serve to transmit working pressures against large lateral areas of the packing to compress the latter. Another endless channel 35, which is formed between the two opposed groups of each set of rings, provides an effective hydraulic seal for preventing the escape of fluid past the bottom of the groove. Channels of the nature of channels 34 and 35 are also present in the assemblies illustrated in Figures 4, 5, 6, 8 and 9.

In addition to the advantages already pointed out, the ring assemblies of this invention have the further desirable characteristics of preventing carbon accumulation, due to the constant relative sliding and squeezing action of the laminations or convolutions; and of being able, due to the extreme flexibility of the individual convolutions and their ability to rapidly assume various distorted circular forms, to adapt themselves within reasonable limits for full uniform sealing contact at all times with a bore that is non-circular and of non-uniform cross-sectional shape.

Preferably, the ring segments of the present invention are formed by bending an elongated band of material edgewise by means of a simple, adjustable apparatus of the type disclosed in my aforementioned Patent No. 1,919,584.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In combination with means providing an annular packing ring groove, a set of thin resilient rings of ribbonlike metal bent edgewise in slightly dished form disposed in said groove with a clearance between them and the bottom of the groove, said groove being sufficiently wide that the rings are compressed laterally without complete loss of their dished form.

2. In combination with means providing an annular packing ring groove of uniform width and accessible in only a radial direction, a set of thin resilient rings of dished form disposed with the dish formation of substantially uniform thickness and located almost entirely within said groove, so as to remain in dished form and so that the dish in some of the rings is arranged oppositely to the dish in other of said rings.

3. In combination with means forming an annular groove designed to receive packing for sealing two relatively movable cylindrical surfaces, a packing assembly comprising a laterally distorted compressible set of resilient and flexible rings formed of material the thickness of which is uniform and much less than its width, said rings being assembled under incomplete compression in said annular groove in several laterally engaged groups to form at least one endless fluid trapping and sealing channel adjacent the bottom of said groove.

4. In combination with a piston having a groove of a given width, a set of very thin and resilient packing rings designed to fit within said groove with their inner edges normally spaced from the bottom of the groove, each ring consisting of at least one substantially complete convolution of ribbon-like metal, each convolution of the several rings being laterally distorted and in compressed side engagement with at least one other convolution, with each convolution of the set free to substantially individually and automatically adjust itself radially during use.

5. In combination with means providing an annular packing ring groove, a set of light resilient rings of dished form snugly disposed in said groove but remaining in dished form therein, each ring consisting of at least one substantially complete convolution of thin ribbon-like metal, certain convolutions of the set of rings being arranged with their dished faces in opposition to the corresponding faces of certain other convolutions of the set, whereby the assembled packing when viewed in cross section has the appearance of several laterally engaged V-shaped sections the crotches of which are located in alignment adjacent the open edge of the groove.

6. A piston ring of the class described consisting of a plurality of helically wound members placed in juxta-position to each other, each member comprising flat spring material shaped substantially frustro-conically so that the inner rim is offset axially of the piston from the outer rim, and each member disposed with its frustro-conical surface facing oppositely to that of the adjacent member.

7. A piston ring of the class described consisting of two substantially frustro-conically shaped and helically wound members placed so in juxta-position to each other, that the outer rims of the members abut each other, each member having approximately two full windings and a bend of a depth substantially equal to the axial dimension of the adjacent member.

8. In combination, a piston having an annular groove therein, and a plurality of frustro-conical ring segments consisting of edgewise bent ribbonlike material designed to nestle in said groove, said segments being mounted in alternately reversed order in said groove without loss of their frustro-conical shape.

9. In combination with means providing an annular packing ring groove, a set of light resilient ring members of dished form nestled within said groove in dished form, each ring member consisting of at least one substantially complete convolution of relatively thin ribbonlike metal of substantially uniform thickness, certain convolutions of the assembly being arranged with their dished faces in opposition to the corresponding faces of certain other convolutions in such manner that the assembled packing when viewed in cross section has the appearance of more than one laterally engaged V-shaped section the apices of which are located in alignment adjacent an edge of the groove.

10. In combination with a packing ring groove, a packing ring assembly comprising a plurality of helically formed gapless rings of frustro-conical shape disposed in lateral engagement with each other, one end of each ring being disposed in complemental abutment with the corresponding end of the adjacent ring.

11. In combination with a plunger designed for reciprocation within the bore of a cylinder, at least one set of light frustro-conical packing rings mounted on said plunger, each ring in lateral engagement with at least one other ring of the same set and consisting of at least one substantially complete convolution of ribbonlike material, said laterally engaged rings having integral directly coacting complemental means for locating themselves circumferentially relative to each other but being free to substantially individually expand and contract radially.

12. A sealing ring comprising thin resilient metal ribbon bent edgewise into the form of an annulus, the material of said ring being slightly dished and of a width several times its thickness.

13. A radially expansible and contractible packing ring comprising a relatively thin and hard steel ribbon bent edgewise into one or more convolutions of dished form.

14. A packing ring member composed of oil tempered ribbon steel that is very thin compared to its width and that has been bent edgewise into at least one frustro-conical convolution, the ring member thereby being very light for its diameter and very resilient and elastic.

15. A packing ring comprising one or more convolutions of material of dished form having the characteristics of a strip of hard metal that has been bent edgewise at relatively low temperature to such form, the working or sealing edge of said ring as manufactured being substantially perpendicular to the dished material of which it is formed.

16. A packing ring member comprising at least one substantially complete convolution of metal of slightly dished form, the metal of the outer edge portion when the ring is in free condition prior to assembly being under internal stresses tending to prevent increase in the ring diameter, and the metal of the inner edge portion under the same condition being under internal stresses tending to increase the ring diameter and decrease the degree of the dished effect.

17. In combination with means affording an annular groove to be packed, a packing ring assembly comprising a plurality of annular segments of one or more convolutions mounted in said groove, said segments comprising springlike material greater in width than thickness and dished so that each convolution is approximately frustro-conical in shape, the outer rim portion of each convolution comprising material under inherent tension and the inner rim portion of each convolution comprising material under inherent compression.

18. In the combination defined in claim 17, said material being of substantially uniform thickness from rim to rim, and the segments being so assembled as to produce one or more lateral clearances V-shaped in cross section.

WILLIAM CORDS.